United States Patent
Andersson

(10) Patent No.: US 7,618,025 B2
(45) Date of Patent: Nov. 17, 2009

(54) MIXING DEVICE FOR MIXING AIR AND WATER IN A WATER PURIFIER

(75) Inventor: Kurt Andersson, Glemmingebro (SE)

(73) Assignee: Anlager Svenska AB, Stockholm (SE)

( * ) Notice: Subject to any disclaimer, the term of this patent is extended or adjusted under 35 U.S.C. 154(b) by 538 days.

(21) Appl. No.: 10/582,746

(22) PCT Filed: Dec. 16, 2004

(86) PCT No.: PCT/SE2004/001882

§ 371 (c)(1),
(2), (4) Date: Jun. 14, 2006

(87) PCT Pub. No.: WO2005/058763

PCT Pub. Date: Jun. 30, 2005

(65) Prior Publication Data

US 2007/0164460 A1  Jul. 19, 2007

(30) Foreign Application Priority Data

Dec. 19, 2003  (SE) .................................. 0303432

(51) Int. Cl.
*B01F 3/04* (2006.01)

(52) U.S. Cl. ..................................... 261/79.2; 261/111

(58) Field of Classification Search .................. 261/76, 261/79.2, 80, 111; 242/615.12
See application file for complete search history.

(56) References Cited

U.S. PATENT DOCUMENTS

| 818,891 | A | * | 4/1906 | Jones et al. .................. 165/113 |
|---|---|---|---|---|
| 895,790 | A | * | 8/1908 | Richards ........................ 261/76 |
| 2,351,864 | A | * | 6/1944 | Linderman, Jr. ............ 261/79.2 |
| 3,722,185 | A | * | 3/1973 | Miczek ........................ 96/316 |
| 3,852,384 | A |   | 12/1974 | Bearden |
| 3,930,816 | A | * | 1/1976 | Miczek ........................ 96/316 |
| 4,473,512 | A | * | 9/1984 | Pick et al. ...................... 261/62 |
| 5,525,242 | A | * | 6/1996 | Kerecz ........................ 210/758 |
| 5,945,039 | A | * | 8/1999 | Kojima ....................... 261/36.1 |
| 5,951,922 | A | * | 9/1999 | Mazzei ....................... 261/36.1 |
| 6,036,178 | A |   | 3/2000 | Nilsson |
| 6,969,052 | B2 | * | 11/2005 | Korzeniowski .............. 261/76 |

FOREIGN PATENT DOCUMENTS

| EP | 0 731 062 A2 | 9/1996 |
|---|---|---|
| SE | 504 449 | 2/1997 |

* cited by examiner

*Primary Examiner*—Scott Bushey
(74) *Attorney, Agent, or Firm*—Tarolli, Sundheim, Covell & Tummino LLP

(57) ABSTRACT

A mixing device for mixing air and water in a water purifier includes a water inlet pipe (2) and an air inlet pipe (3). The air inlet pipe (3) extends coaxially within the water inlet pipe (2) and defines therewith an annular gap (4) for providing an annular water jet. Downstream of the annular gap (4) there is provided a mixing member (6) for mixing water and air. The mixing member (6) includes a water flow disturbing device (7) which is provided to be hit by the annular water jet. At least those parts (2a) of the water inlet pipe (2) and/or those parts (3a) of the air inlet pipe (3) which define the annular gap (4), are made of plastic material. The water flow disturbing device (7) includes at least one helical member (8) which extends along the inner side of the mixing member (6) around through-flow portions (6a) thereof within the helical member (8) such that helical movements are imparted to the annular jet of water when it flows downwards through the through-flow portions (6a).

13 Claims, 1 Drawing Sheet

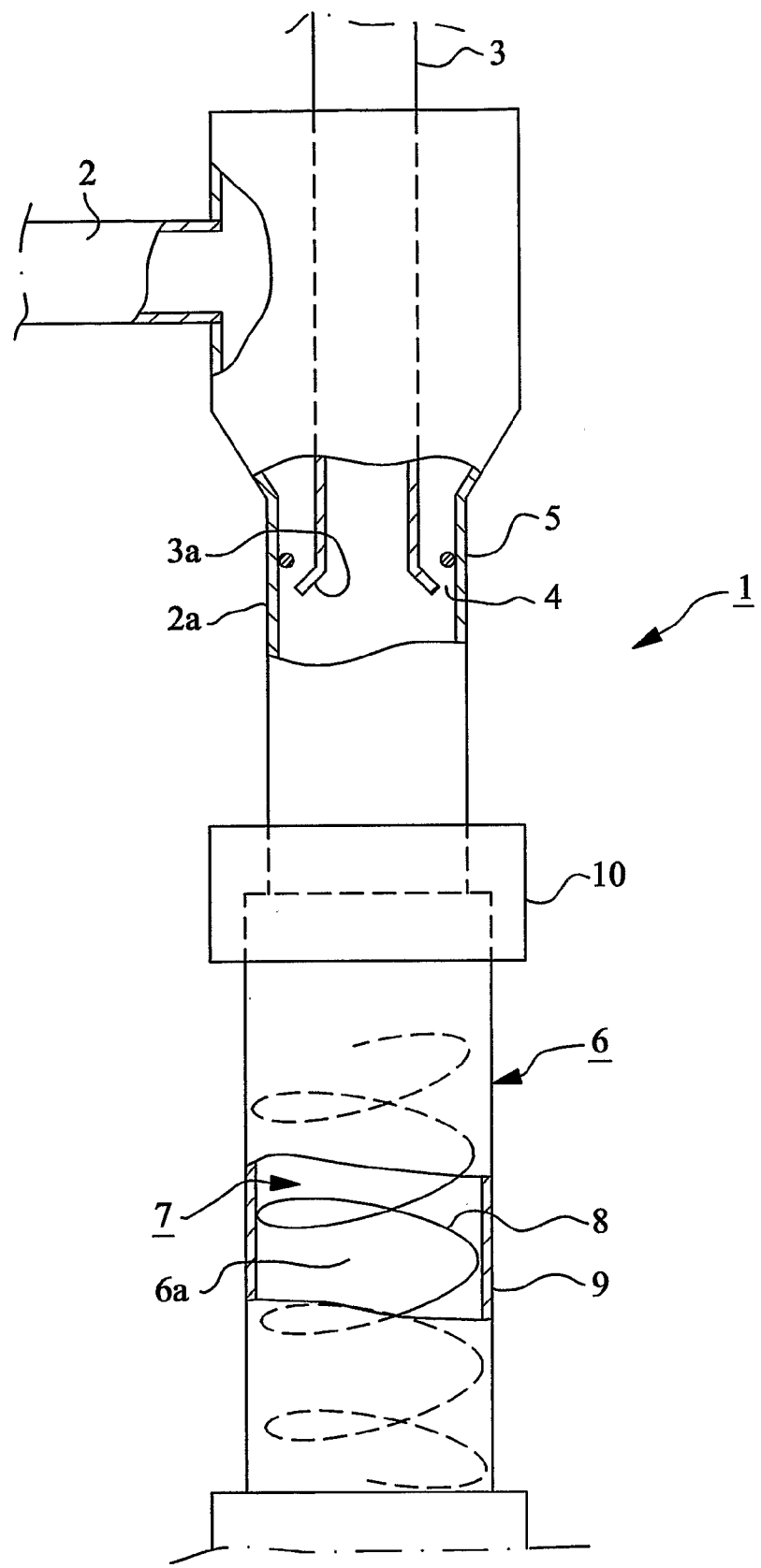

MIXING DEVICE FOR MIXING AIR AND WATER IN A WATER PURIFIER

CROSS-REFERENCE TO RELATED APPLICATION

This application corresponds to International Application No. PCT/SE2004/001882, filed Dec. 16, 2004, which claims the benefit of Swedish Application No. 0303432-9, filed Dec. 19, 2003, all of which are incorporated herein in their entirety by reference thereto.

1. Field of the Invention

The present invention relates to a mixing device for mixing air and water in a water purifier. The mixing device comprises a water inlet pipe and an air inlet pipe. The air inlet pipe extends coaxially within the water inlet pipe and defines therewith an annular gap for providing an annular water jet. Downstream of the annular gap there is provided a mixing member for mixing water and air. The mixing member includes a water flow disturbing device which is provided to be hit by the annular water jet.

2. Background of the Invention

Mixing devices for mixing water and air in water purifiers or water treatment units are already known from e.g. SE 504 449, U.S. Pat. No. 3,852,384 and EP 0 731 062, but these have drawbacks since they are easily clogged up and consist of complex and thereby expensive constructions.

SUMMARY OF THE INVENTION

The object of the present invention is to eliminate these drawbacks and this is arrived at by providing the initially defined mixing device with a flow disturbing device such that helical movements are imparted to the annular jet of water when it flows downwards through the device.

Since pipe members defining the gap consist of plastic material, clogging up of the gap is prevented or at least substantially delayed and since the water flow disturbing means consists of a helical means which is provided around through-flow portions of the mixing device, a simple construction is obtained and the flow of water is guided in a helical path, whereby mixing of air and water in the mixing member and thereby, the oxygenization of the water, is improved.

BRIEF DESCRIPTION OF THE DRAWINGS

The invention will be further described below with reference to the accompanying drawing, which is a schematic view of the mixing device of the invention.

DESCRIPTION OF EXAMPLE EMBODIMENTS

The mixing device 1 illustrated in the drawing is at least partly located in a water purifier including a water purifying tank (not shown) and it is adapted to mix air and water in order to oxygenize the water and thereby obtain an effective purification thereof.

The mixing device 1 comprises a water inlet pipe 2 and an air inlet pipe 3. The air inlet pipe 3 extends coaxially within the water inlet pipe 2 and defines therewith an annular gap 4 for generating an annular water jet. This device operates in a known manner according to the ejector principle.

The air inlet pipe 3 may have an end portion which expands outwardly in a direction towards surrounding parts of the water pipe 2 and which defines the annular gap 4. Upstream of the annular gap 4, the water pipe 2 may include a ring 5 which can be set in axial direction relative to the gap 4 and which is adapted to control the size of the gap 4 and thereby, the flow of water therethrough.

Downstream of the annular gap 4 there is provided a mixing member 6 with through-flow portions 6a in which water and air are mixed. This mixing member 6 includes a water flow disturbing device 7 which is provided to be hit by the annular water jet.

At the mixing device 1 illustrated in the drawing, at least those parts 2a of the water inlet pipe 2 and/or those parts 3a of the air inlet pipe 3 which define the annular gap 4 are made of plastic material in order to prevent or at least substantially counteract that substances present in the water, such as lime and metals, are deposited on said parts 2a and/or 3a and clog up the annular gap 4 in a short time. The plastic material can be an olefine polymer, preferably polyethylene, which has a particularly good substance repelling capacity.

At the mixing device 1, the water flow disturbing device 7 includes at least one helical means 8 which extends along the inner side of the mixing member 6 around the through-flow portion 6a such that helical movements are imparted to the annular water jet, whereby the mixing effect between air and water and thereby, the oxygenization of the water, is advantageous.

The through-flow portion 6a is preferably not provided with any part or member within the helical means 8.

The mixing member 6 preferably consists of a tube 9, on the inner side of which the helical means 8 is provided. Interiorly, the tube 9 may be of uniform thickness and the helical means 8 may extend along the entire or at least the major part of the length of the tube. The tube 9 may consist of metal material, e.g. stainless steel.

The helical means 8 may be a helical wire of metal material or another suitable material. Preferably, the helical means consists of a helical spring which has a greater diameter than the inner diameter of the tube 9 and which can be screwed together in order to reduce its diameter such that it can be inserted into the tube 9. By thereafter releasing the spring, said spring will spring out, expand, and will thereby engage the tube 9 with pressure and cling thereto by itself. Preferably, the end portions of the spring are thereafter attached to the tube 9.

For eventual cleaning of the helical spring or similar and/or the tube 9, the helical spring may be compressed and withdrawn from the tube 9 and after said cleaning it may again be inserted into the tube 9.

The invention is not limited to the embodiment described above and illustrated in the drawings, but may vary within the scope of the subsequent claims. Thus, said plastic material may be of another type than an olefine polymer, there may be more than one helical means 8, it may be of another type than a wire or spring and there may be a pipe coupling 10 of metal material, e.g. stainless steel, for connecting the plastic parts 2a of the water inlet pipe 2 with the metal parts of the mixing member 6. The helical means 8 may, by being screwed together if it is a helical spring or compressed if it is of another type, be removed from the mixing member 6 for e.g. cleaning of the helical means 8 or the mixing member 6 or for another purpose.

Except said parts 2a and/or said parts 3a of the water inlet pipe 2 and/or the air inlet pipe 3, defining the annular gap 4, the water inlet pipe 2 and/or the air inlet pipe 3 may in their entirety or for substantial parts thereof consist of the plastic material.

The invention claimed is:

1. Mixing device for mixing air and water in a water purifier, wherein:
   the mixing device (1) comprises a water inlet pipe (2) and an air inlet pipe (3),
   the air inlet pipe (3) extends coaxially within the water inlet pipe (2) and defines therewith an annular gap (4) for providing an annular water jet,
   downstream of the annular gap (4) there is provided a mixing member (6) for mixing water and air, and
   the mixing member (6) includes a water flow disturbing device (7) which is provided to be hit by the annular water jet,
   at least those parts (2a) of the water inlet pipe (2) and/or those parts (3a) of the air inlet pipe (3) which define the annular gap (4), consist of plastic material, and
   the water flow disturbing device (7) includes at least one helical means (8) which extends along the inner side of the mixing member (6) around through-flow portions (6a) thereof within said helical means (8) such that helical movements are imparted to the annular jet of water when it flows downwards through said through-flow portions (6a).

2. Mixing device according to claim 1, wherein the plastic material which said parts (2a and/or 3a) of the water inlet pipe (2) and/or the air inlet pipe (3) consist of, is olefine polymer.

3. Mixing device according to claim 2, wherein said olefine polymer is polyethylene.

4. Mixing device according to claim 1, wherein the helical means (8) has the shape of a wire.

5. Mixing device according to claim 4, wherein the helical means (8) is a metal wire.

6. Mixing device according to claim 1, wherein the helical means (8) is located on the inner side of a tube (9) forming part of the mixing member (6).

7. Mixing device according to claim 6, wherein the helical means (8) extends along the entire or at least the major part of the mixing member (6).

8. Mixing device according to claim 1, wherein:
   the helical means (8) consists of a helical spring having a diameter which is greater than the inner diameter of the mixing member (6),
   the spring can be screwed together for reducing its diameter such that it can be inserted into the mixing member (6), and
   the helical spring, by being released after insertion into the mixing member (6), can be brought to expand until it with pressure engages the inner side of the mixing member (6).

9. Mixing device according to claim 8, wherein the helical spring can be removed or withdrawn from the mixing member (6) by screwing together said spring for reducing its diameter.

10. Mixing device according to claim 1, wherein the through-flow portion (6a) is provided with no parts or members within the helical means (8).

11. Mixing device according to claim 1, wherein the mixing member (6) includes a tube (9) which interiorly is of uniform thickness.

12. Mixing device according to claim 1, wherein plastic parts (2a) of the water inlet pipe (2) and metal parts of the mixing member (6) are interconnected by means of a pipe coupling (10) of metal material.

13. Mixing device according to claim 1, wherein a flow control means (5) is provided for controlling the flow through the annular gap (4).

* * * * *

UNITED STATES PATENT AND TRADEMARK OFFICE
CERTIFICATE OF CORRECTION

PATENT NO. : 7,618,025 B2
APPLICATION NO. : 10/582746
DATED : November 17, 2009
INVENTOR(S) : Kurt Andersson It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 694 days.

Signed and Sealed this

Nineteenth Day of October, 2010

David J. Kappos
*Director of the United States Patent and Trademark Office*